United States Patent [19]

Grant et al.

[11] 4,206,696
[45] Jun. 10, 1980

[54] CHEESE CURD PROCESSING APPARATUS AND METHOD

[75] Inventors: George N. Grant, Canastota, N.Y.; Douglas B. Campbell, Santa Rosa, Calif.

[73] Assignee: Bepex Corporation, Santa Rosa, Calif.

[21] Appl. No.: 797,569

[22] Filed: May 16, 1977

[51] Int. Cl.² ............... A01J 11/06; A01J 25/11
[52] U.S. Cl. ........................... 99/457; 99/458; 99/461; 99/464; 99/465; 100/119; 100/121; 198/823
[58] Field of Search ............. 99/452, 495, 456–459, 99/464–466; 100/151–154, 118, 121, 119, 120; 210/400–401, 386; 426/302, 478, 491, 495, 582; 198/823

[56] References Cited

U.S. PATENT DOCUMENTS

| | | | |
|---|---|---|---|
| 502,523 | 8/1893 | Lockstaedt | 100/120 |
| 2,980,538 | 4/1961 | Wolfe | 426/506 |
| 3,446,139 | 5/1969 | Coffelt | 100/118 |
| 3,459,123 | 8/1969 | Begiebing | 100/118 |
| 3,876,548 | 4/1975 | Welles, Jr. | 210/391 |
| 3,887,718 | 6/1975 | Hinds, Jr. | 426/491 |
| 3,889,802 | 6/1975 | Jonkers | 198/823 |
| 3,974,026 | 8/1976 | Emson | 100/121 |

OTHER PUBLICATIONS

Sales Brochure, published by Stoelting Brothers Co., Kiel, Wisconsin.

*Primary Examiner*—Harvey C. Hornsby
*Assistant Examiner*—Timothy F. Simone
*Attorney, Agent, or Firm*—McDougall, Hersh & Scott

[57] ABSTRACT

Apparatus and method for processing fresh cheese curd such as is produced in the manufacture of cottage cheese. Employs a belt in the form of a plastic screen which is caused to press a continuous layer of the curd against the peripheral surface of a rotatable drum to express liquid and to provide a curd of the desired moisture content for further processing. The pressing action can be controlled by adjusting the belt tension.

11 Claims, 6 Drawing Figures

FIG.—1

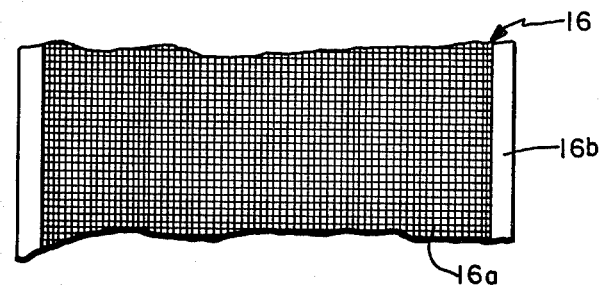
FIG.—3
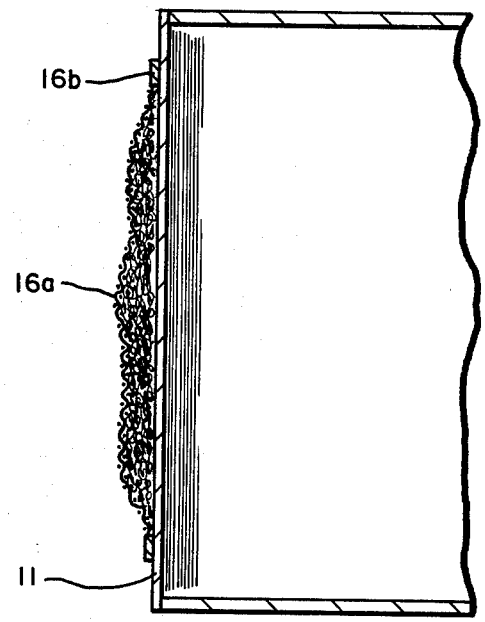
FIG.—4
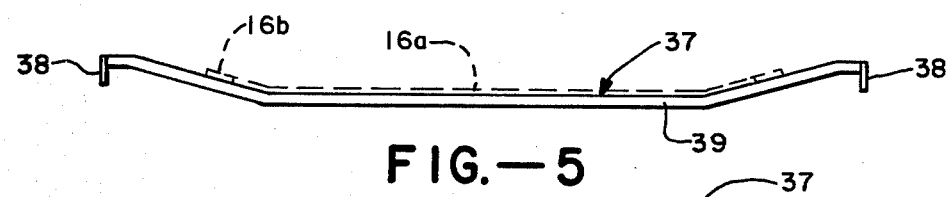
FIG.—5
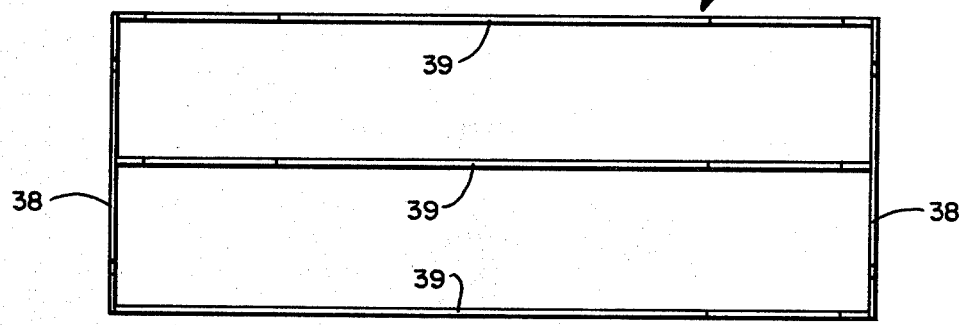
FIG.—6

CHEESE CURD PROCESSING APPARATUS AND METHOD

BACKGROUND OF THE INVENTION

This invention relates generally to apparatus and methods for the processing of cheese curd, and particularly wet cheese curd that is produced in the manufacture of cottage cheese.

In the manufacture of cottage cheese, the casein content of milk is coagulated as by introducing a starter, after which fermentation, with or without addition of acid, increases the acidity to the isoelectric point at which the casein is coagulated as a curd. Thereafter the curd is cut into small cubes and subjected to heating or cooking to arrest bacterial development. After cooling the curd is separated from the whey and subjected to one or more washings with fresh water. Various equipment and procedures have been used for draining and washing. In the older method, the material is cooked in a vat having a screened end whereby the whey is permitted to be drawn off. The curd may be subjected to one or more washings in the same vat, and the wash water likewise removed. A more modern procedure is to pump the material after heat treatment into a washer-cooler wherein the material is subjected to upwardly flowing wash water to displace whey from the curd fragments. Whey and the first wash water may be removed from the washer-cooler by decantation, and then the curd with the last wash water is pumped into a drainer-creamer. The drainer-creamer is a vessel having perforated vertical tubes extending upwardly from the bottom which allow water to drain out from the curd bed. While this type of equipment and method is an improvement over the older traditional methods, it has certain disadvantages. The curd tends to pack about the drain tubes, thus clogging the perforations, especially with soft curds. Also the time required to carry out effective drainage may be excessive, as for example 40 minutes to 2 hours. After the curd has been drained to about 20% solids content (oven dry basis) in such a drainer-creamer, the drain tubes are removed, and assuming that the curd is to be made into creamed cheese, a creaming mix is added and the mixture blended and pumped to the packaging line. Treatment within the drainer-creamer, including the addition of the creaming agent, is carried out in such a manner as to produce a desired solids content by weight, which in the case of cottage cheese is 20% solids. With such apparatus, the solids content of the curd varies from batch to batch. It will be evident that the production of a final product having a specified solids content of the curd after the draining operation described above often varies considerably from a predetermined target percentage.

Another type of draining apparatus which has been used to some extent is known by the trade name of "Curd-O-Matic". The Curd-O-Matic equipment makes use of a woven stainless steel belt upon which the curd is deposited, the belt being supported by a plurality of rolls and driven through washing and pressing stages. At the washing station the curd is subjected to sprays of refrigerated water, and in the pressing station the curd is pressed against the stainless steel belt and the underlying rolls by an overlying belt. The moisture content of the curd is adjusted by raising or lowering the overlying pressing belt. This equipment likewise has a number of disadvantages. Particularly, the size of the equipment is relatively large for a given capacity. The equipment is expensive because of its relatively complex mechanical construction. Also because of its complex construction the equipment is relatively unsanitary. Another equipment, similar to the Curd-O-Matic, has employed a screen belt made of plastic material supported by a table.

Another type of prior apparatus employs a drum having a perforated periphery that serves as a backing for a screen belt. The curd is delivered upon the screen and is pressed against the screen and drum by an overriding imperforate belt. Its performance likewise has been unsatisfactory due among other things to the relatively small area of drum perforations compared to the total area of the drum periphery.

OBJECTS OF THE INVENTION AND SUMMARY

In general it is an object of the invention to provide an improved apparatus and method for the treatment of cheese curd which will express liquid from the curd to produce a material suitable for subsequent creaming or other processing.

Another object is to provide an apparatus and method for treatment of cheese curd which will apply gentle pressure to a curd bed to effect release of entrapped liquid without damage to the curd particles.

Another object is to provide an apparatus and method which is controllable to provide control over the moisture content of the resulting curd.

Another object is to provide an apparatus and method which is capable of continuous operation whereby the entire cheese manufacturing process can be automated.

Another object is to provide apparatus which is simple in construction and relatively inexpensive, and which can be easily cleaned and maintained in sanitary condition.

Another object is to provide apparatus which is relatively compact for a given capacity, and which can be mounted at an elevation for gravity discharge into the creaming equipment employed.

In general, the apparatus consists of a cylindrical drum rotatable about a horizontal axis. An endless belt in the form of a screen made of non-metallic plastic material is carried by rolls whereby a portion of the screen is engaged about the lower peripheral surface of the drum. Curd feeding means deposits a layer of curd upon a portion of the belt which is advancing toward the drum, and the curd is carried about the lower peripheral surface of the drum between the drum and the screen. The belt is so constructed that the side margins are of such strength that they maintain contact with the drum. While being carried about the drum gentle pressure is applied by the screen as it stretches and conforms to the curd to cause liquids to be expressed from the curd through the screen. Since the curd is not distributed out to the full width of the belt, the side margins press against the drum causing in effect a seal to prevent the curd from falling away from the belt and drum. At the other side of the drum the layer of curd from which water has been expressed in separed from the belt and discharged for further processing. Preferably the tension of the belt is adjustable, thereby controlling the pressing action upon the curd. The invention also includes the method carried out in the operation of the apparatus.

Additional objects and features of the invention will appear from the following description in which the preferred embodiment has been set forth in detail in conjunction with the accompanying drawing.

BRIEF DESCRIPTION OF THE DRAWING

FIG. 3 is a detail in plan showing the construction of the belt.

FIG. 4 is a detail in section taken along the line 4—4 of FIG. 1.

FIG. 5 is an end view of a frame for warping the belt.

FIG. 6 is a plan view of the frame shown in FIG. 5.

DESCRIPTION OF THE PREFERRED EMBODIMENT

Figure 1:
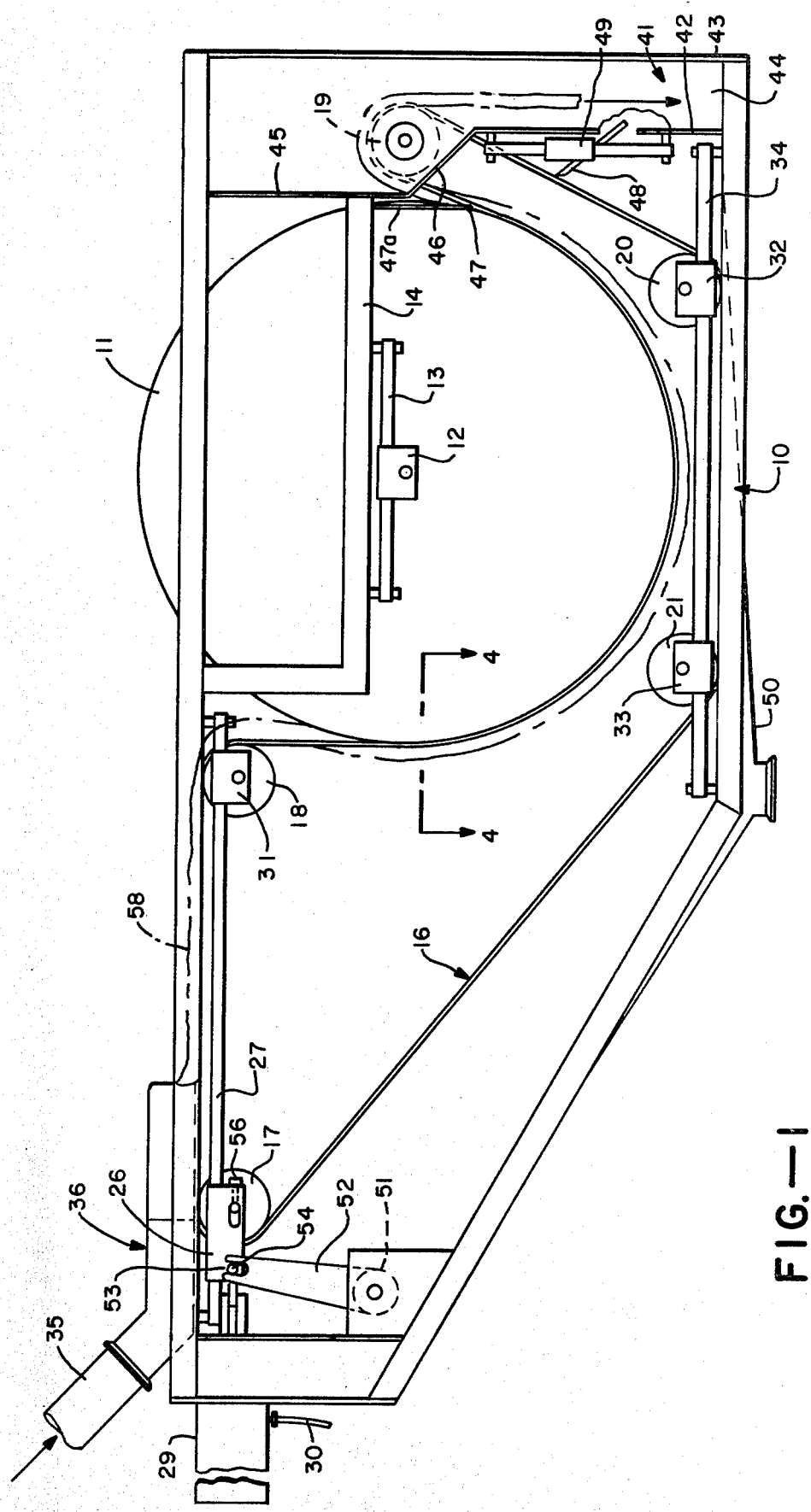
FIG. 1 is a side elevational view illustrating apparatus incorporating the present invention.

The apparatus as illustrated in the drawing consists of a frame 10 which carries the rotatable drum 11. The drum is made of suitable metal or metal alloy, such as stainless steel, and has a smooth cylindrical peripheral surface. The shaft of the drum is carried by the bearing blocks 12, which in turn are shown secured to the frame members 13 and 14. An endless pressing belt 16 cooperates with the drum 11 and is carried by tracking means provided by the rollers 17, 18, 19, 20 and 21. The belt is in the form of a screen made of suitable plastic material, such as a polyester, and as illustrated in FIG. 3 it includes a screen portion 16a having its edges integrally bonded to the side margins 16b. The filaments of which the screen portion 16a are made may have a diameter of the order of 200 micrometers and are distributed to provide screen openings of the order of 400 micrometers. The margins 16b may be made of polyurethane with a thickness of the order of about 1/16 of an inch and a width of about 0.5 to 1.0 inches. Both the filaments from which the screen portion 16 is made and the edge portions 16b have elasticity in that they elongate with applied tension. Also the characteristics of the filaments and the margins 16b are such that they have good recovery after being elongated under tension.

The roll 17 is shown carried by the bearing block assemblies 26 which are slidably carried by the frame members 27. The bearing blocks 26 are connected by member 28, which in turn is attached to the operating rod of a pneumatic actuator 29. The actuator preferably is one of the cylinder-piston type, being connected by pipe 30 to a source of pneumatic pressure. The piston is attached to the operating rod which in turn connects with the member 28. The source of pneumatic pressure is controllable whereby a desired pneumatic pressure can be applied to obtain a desired predetermined amount of force upon the bearing blocks 26 of the roll 17.

Roll 18 is carried by bearing blocks 31 which are secured to the frame members 27. Roll 19 has its shaft suitably journalled in the sides of the frame, and rolls 20 and 21 are rotatably carried by the bearing blocks 32 and 33 that are carried by the frame member 34.

With the belt carried by rolls in the manner described above, and with tension being applied to the belt by actuator 29 and roll 17, it will be evident that when roll 19 is driven in a clockwise direction the belt moves from roll 17 to roll 18, and from thence downardly about the lower peripheral surface of the drum 11, then upwardly and about the roll 19, and from thence back to the roll 17 beneath the rolls 20 and 21. Suitable means can be provided for driving the roll 19 at a desired speed, as for example, the hydraulic motor 19a. This roll may be made with a slight crown to aid tracking of the belt.

When the apparatus is operating, a continuous layer of wet curd is deposited upon that portion of the belt extending between the rolls 17 and 18. For this purpose there is shown an inlet pipe 35 which is connected to a curd pump, and which connects with the spreader 36. The bottom wall 36a of the spreader is disposed adjacent to and parallel to the belt, and the side walls 36b at the open end of the spreader are spaced apart a distance somewhat less than the width of the belt. A continuous bed of the wet curd is deposited upon the belt, and is carried by the belt toward the drum. In a typical instance the curd bed may be of a thickness ranging from 1 to 1½ inch.

Figure 2:
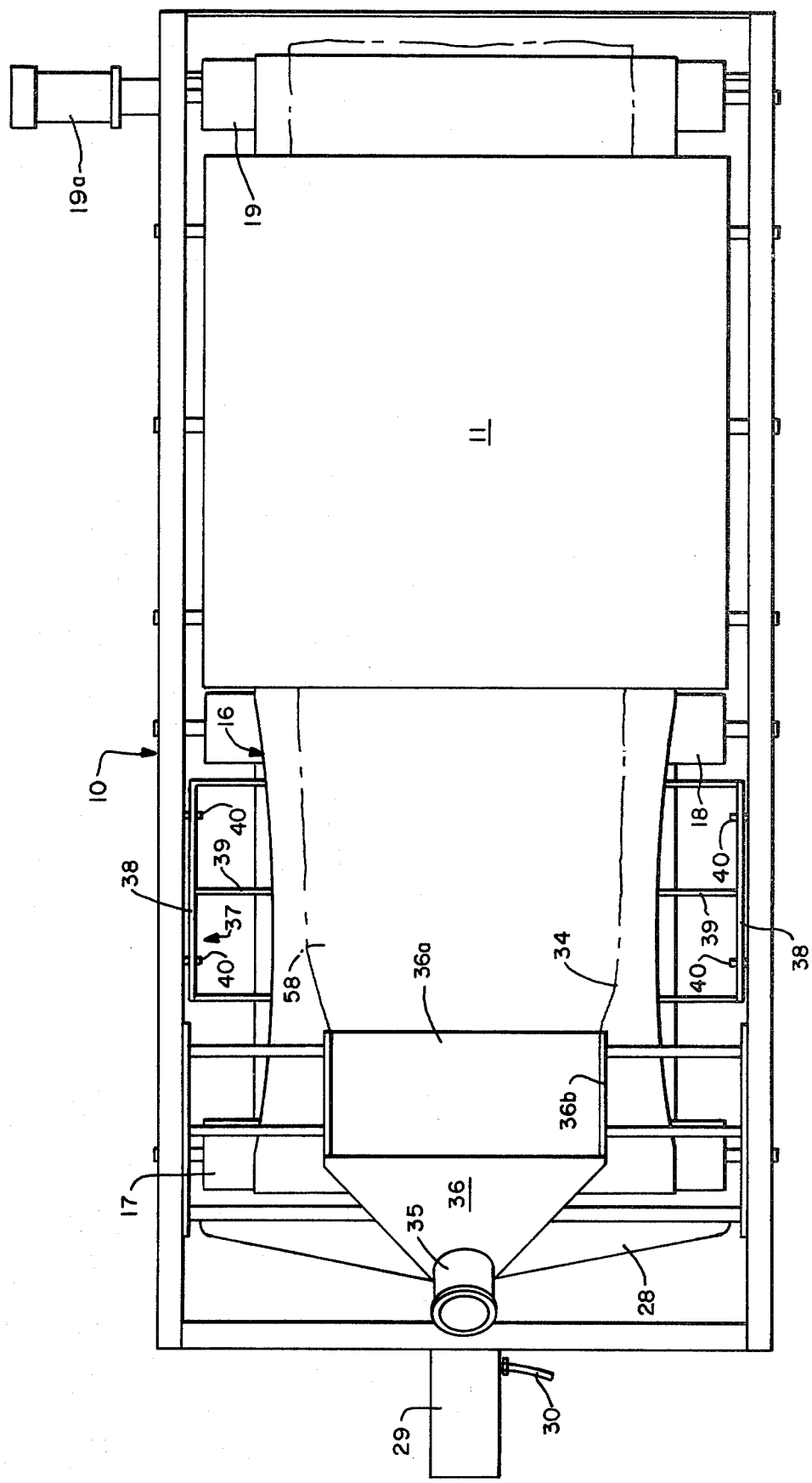
FIG. 2 is a plan view of the apparatus shown in FIG. 1.

The upper run of the belt between the rolls 17 and 18 is warped whereby its upper surface is concave to prevent the curd from flowing laterally to the edges of the belt. Means is provided for this purpose consisting of a frame 37 formed of end bars 38 secured to the transverse bars 39. The bars 39 are formed to the configuration shown in FIG. 5, and the frame is disposed below the upper run of the belt between rolls 17 and 18, whereby the belt is engaged by the bars 39 to cause the belt to take a comparable configuration. As shown in FIG. 2, the frame 37 is carried by pins or bolts 40 which are mounted upon the sides of the main frame.

At the right hand end of the apparatus as shown in FIG. 1, there is a discharge hopper 41 formed by the spaced transverse walls 42 and 43 and the connecting side walls 44. The roll 19 is disposed above this hopper, with the downward oriented surface of the belt disposed directly above the hopper opening. The exterior sides of walls 44 are provided with reinforcing ribbing 45, 46.

Means is provided for separating the bed of pressed curd from the drum immediately before the belt recedes from the drum and passes over the roll 19. Suitable means for this purpose consists of a filament 47, which may be made of nylon monofilament, which is located and tensioned in such a manner that it contacts the drum periphery in the region where the belt and bed of curd commence to recede from the drum. The ends of the filament 47 are suitably secured to the lower ends of the depending rods 47a at the sides of the frame. By way of example, the monofilament may be of a diameter of the order of 0.060 inches.

In operation, a small amount of curd tends to adhere to the surface of the belt. To effect a removal and discharge of such adhering material, a doctor knife 48 is provided which contacts the exterior surface of the belt between the rolls 19 and 20. The knife can be carried by suitable adjustable mounting means 49.

The lower part of the frame is provided with a collecting pan 50 for receiving liquid extracted from the curd.

Certain features aid in proper tracking of the belt on the rolls. In addition to the slight crown of roll 19, the flexing of the belt as it passes over the bars 39 of frame 37 promotes tracking with maintenance of the belt in a desired centralized position on the drum. Tracking is also aided by maintaining the axes of the drum and the rolls parallel. To ensure that roll 17 is maintained parallel the blocks 26 are cross-connected to ensure that their movements as effected by the actuator 29 are in unison.

Thus a rigid tube or bar 51 has its ends pivotally carried at the side of the frame. Arms 52 are fixed to the ends of the tube and the free ends of the arms are provided with slots 53. The ends 54 of member 28 engage in the slots 53 and also the ends of member 28 engage the blocks 26. With this cross-connecting means the blocks 26 are constrained to move in unison to maintain parallel relationship with the drum and the other rolls. Fine adjustments to obtain parallel relationship can be made by set screws 56 which vary the positions of the ends of the roll 17 relative to the blocks.

Operation of the apparatus and the carrying out of the method are as follows. Cut curd with wash water is delivered to the spreader 36 while the belt is being driven by the roll 19. Driving of the roll 19 and the belt also serves to drive the drum 11 by virtue of frictional engagement of the belt with the peripheral surface of the drum. A bed of curd being deposited upon the belt is shown at 58 in FIG. 2. It will be noted that the width of the bed is less than the distance between the belt margins 16b. Much of the liquid of the curd immediately drains through the openings of the screen and is received in the drain collecting pan 50. Most of the expressed liquid impinges and passes through the returning belt, causing it to be washed in a reverse direction and cleaned of small particulates adhering to the belt. As the curd is carried over the roll 18, it contacts the peripheral surface of the drum 11, and the screen part of the belt between the margins 16b is bulged outwardly from the periphery of the drum whereby it presses upon the curd layer to effect further expressing of liquid. During the travel of the pressed curd bed around the periphery of the drum it is continuously subjected to gentle pressure whereby liquid continues to be expressed from the curd to eventually provide a curd bed having a desired solids content. In a typical instance the pressure upon the curd bed exerted by the tensions of the screen may be of the order of 1 pound per square inch, and the time required for the curd bed to progress from one side of the drum to the other for discharge may be of the order of 6 and 12 seconds. At the discharge side of the drum the curd bed is separated from the drum by the separation monofilament 47, although it continues to be carried over the roll 19, after which it falls through the lower open end of the hopper 41. From the roll 19 the belt passes downwardly and back to the roll 17 beneath the rolls 20 and 21. The elasticity and recovery characteristics of the belt are such that the belt assumes its normal flat form immediately after it is relieved of the curd bed.

It will be evident that the apparatus and method described above have a number of desirable features. The apparatus is relatively simple, having reference particularly to the use of relatively few parts which are easily cleaned to maintain sanitation. The gentle pressure applied to the curd expresses the water without causing mechanical damage to the curd. Such damage is undesirable, particularly in that it increases the number of fines which are lost with the removed liquid. Because of the relatively small openings in the screen and the gentle pressure applied, fines that may be present are largely retained with the curd and are not expressed through the screen. By maintaining a given belt tension the solids content of the discharging curd remains relatively constant. Adjusting the belt tension serves to change the pressure exerted on the curd bed, thereby adjusting the solids content to a desired level. The apparatus is relatively compact for its operating capacity, and therefore it can be installed at an elevation to deliver curd by gravity to equipment located at lower elevations for further processing operations.

Although the invention has been disclosed as particularly applicable to the processing of cottage cheese curd immediately preceding a creaming operation, it will be evident that the invention can be used on various types of cheese curd from which it is desired to remove liquids to produce a curd of a specific solids content for further processing.

The foregoing description assumes that the curd is supplied to the apparatus following a washing operation and with a substantial amount of wash water that remains with the curd. However, some whey may also be carried with the curd. Thus the liquid expressed from the curd consists of water with or without whey solids dispersed in water.

What is claimed is:

1. An apparatus for processing fresh cheese curd together with a substantial liquid content, comprising a cylindrical drum mounted for rotation about a horizontal axis, an endless flexible belt in the form of a screen made of non-metallic plastic material, the opposite side edges of said belt comprising higher strength portions free of screen openings, means including first, second and third rotatable rolls, said rolls carrying the belt whereby the belt is disposed to extend in a generally horizontal direction from the first roll over which it is looped to one side of the drum where it engages the second roll and from thence extends downwardly and about the lower peripheral surface of the drum to a region adjacent the other side of the drum where it is looped about the third roll and then returned back to the first roll below and in spaced relationship to the drum, one surface of said belt facing said lower peripheral surface of said drum as the belt moves downwardly and about the drum, means for maintaining a predetermined tensioning of the belt, means for feeding wet curd to that portion of the belt extending between the first and second rolls, said curd being fed to said one said surface of said belt, and means for driving the belt whereby curd deposited on the belt is caused to be carried about the lower peripheral surface of the drum between said drum surface and the belt, thereby causing the curd to be pressed by the belt to cause liquid to be expressed therefrom, the portion of said belt between said side edges flexing to conform to the curd deposited on the belt, the maintaining of said predetermined tensioning of the belt causing said side edges to engage said drum surface for thereby holding the curd between the belt and drum surface, said drum being driven at the same speed as the belt thereby maintaining a gentle pressure on the curd and thereby eliminating the application of shearing forces to the curd.

2. Apparatus as in claim 1 in which said belt is formed of an elastic fabric, said means for feeding wet curd to the belt confining the curd to a location spaced inwardly of the opposite side edges of the belt, the elasticity of the belt fabric being such that the belt conforms to irregularities in the shape of the curd bed without damage to the curd and said side edges maintain contact with the drum surfaces beyond the width of the curd bed.

3. Apparatus as in claim 1 together with means for effecting separation between the layer of curd and the peripheral surface of the drum in a region where the belt recedes from the drum toward the third roll.

4. Apparatus as in claim 1 in which said tensioning means is connected to the first roll and is adjustable.

5. Apparatus as in claim 4 in which said tensioning means consists of a cylinder-piston device connected to a source of pneumatic pressure.

6. Apparatus as in claim 4 together with means for constraining said first roll to maintain its axis parallel to the axis of the second roll.

7. Apparatus as in claim 1 including a frame extending between the first roll and second roll, said frame supporting said belt as the wet curd is fed to the belt, said frame defining concave supporting means to thereby maintain said belt in concave condition.

8. Apparatus as in claim 4 including opposed bearing blocks supporting said first roll, a cross member extending between the bearing blocks, said tensioning means comprising a cylinder and piston device with the piston being attached to said cross member for simultaneously applying adjusting force to each bearing block.

9. Apparatus as in claim 1 wherein liquid collecting means is positioned beneath the belt portion which is looped about the third roll and returned back to the first roll below the drum, liquid expressed from the belt being caused to pass through said belt portion for washing said belt portion before being collected by said collecting means.

10. Apparatus as in claim 1 wherein the frictional engagement of the belt with the peripheral surface of the drum provides the driving force for the drum.

11. Apparatus as in claim 1 including means for warping that portion of the belt extending between said first roll and said second roll whereby the upper side of said portion of the belt is concave.

* * * * *